May 23, 1933. G. B. HOAG 1,910,289
MULCH AND THE METHOD OF MAKING AND APPLYING THE SAME
Filed April 1, 1932
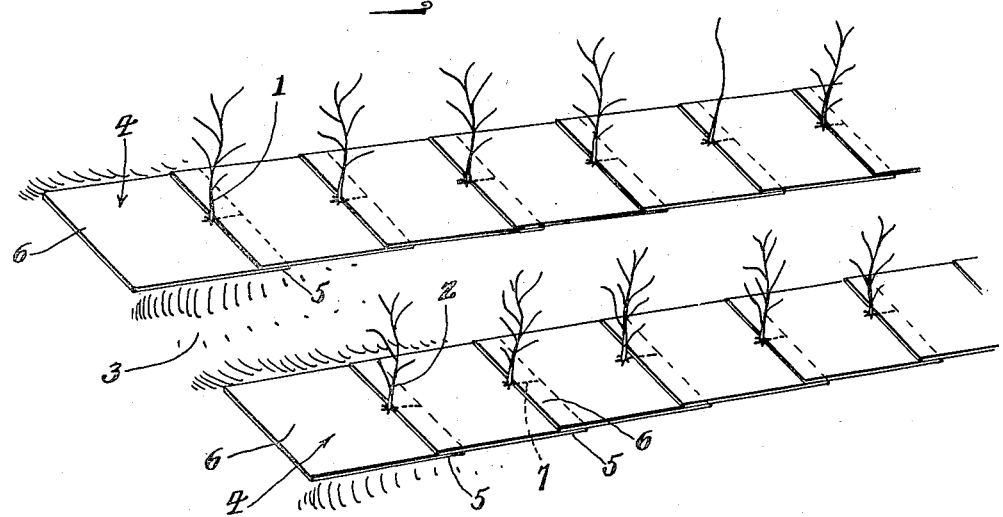
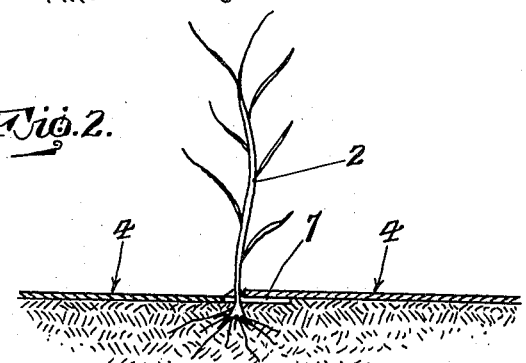
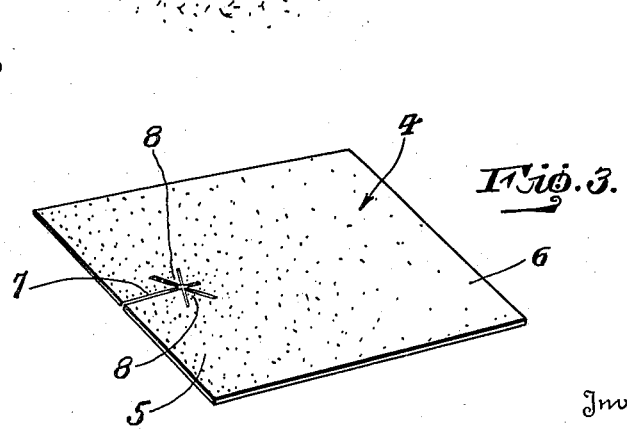
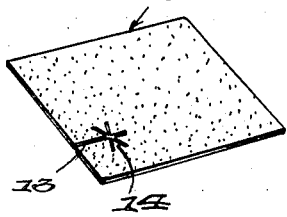
Inventor
Glen B. Hoag
By Geo. P. Kimmel
Attorney Patented May 23, 1933

1,910,289

UNITED STATES PATENT OFFICE

GLEN B. HOAG, OF FULLERTON, CALIFORNIA

MULCH AND THE METHOD OF MAKING AND APPLYING THE SAME

Application filed April 1, 1932. Serial No. 602,561.

This invention relates to a mulch and to the method of making and applying the same.

A mulch, in accordance with my invention is designed primarily for use in arid or semi-arid regions where moisture is costly and artificially supplied, but it is to be understood that the mulch may be employed wherever it is found applicable.

The essential objects of my invention are to facilitate and to enhance the growth of plants after the latter are up or set into the ground; to reduce the evaporation of moisture and thereby retain it as long as possible and to retain the moisture as close to the surface as possible throughout the root zone of the plant; to reduce to a minimum the reflecting of the rays of the sun striking the mulch mat to prevent sunburn to the plant; to provide a space between the rows of plants for the application of water in furrows or otherwise from where by seepage the soil becomes moist under the mulch mat and is drawn to the surface of the soil under the mulch by capillary attraction; covering the whole root system of the plant for keeping the soil moist and loose under the mulch mat; and to attain these ends in a durable, compact, thoroughly efficient and inexpensive structure and in the method of producing and applying it.

To the above ends essentially and others which may hereinafter appear, my invention consists of a construction of the mulch and method of making and applying it which fall within the scope of the invention as claimed.

In the drawing:

Figure 1 is a perspective view illustrating two rows of growing plants separated by a furrow and showing the application to the plants of the manner of mulching thereof in accordance with my invention.

Figure 2 is a longitudinal sectional view of a pair of overlapping mulch mats in accordance with my invention and illustrating the adaptation thereof with respect to a growing plant.

Figure 3 is a perspective view of a mulch mat in accordance with my invention in the state for application to a plant.

Figures 4 and 5 are perspective views of modified forms of mulch mats in accordance with my invention in state for application.

Referring to the drawing, 1 and 2 denote two rows of growing plants separated by a furrow 3 to which water is supplied for seepage to rows 1 and 2. Seated upon the soil and encompassing each plant of a row is a mulch mat 4. Each mat of each row of mats will be defined as having slitted inner and non-slitted outer end parts 5, 6 respectively. The upper face of the end part 5 of one mat is overlapped by the lower face of the end part 6 of an adjacent mat. Each mat is formed with a slit centrally of its end part 5, as at 7 and the edges of the latter are torn, slitted or incised in proximity to the closed end of the slit to form bendable freed portions 8 capable of being crimped or to snugly engage about the plant in close proximity to the ground level without widening slit 7.

Positioned upon the inner end part 5 and closing the major portion of the slit in the latter, is the outer end part 6 of an adjacent mat. The edge of such end part 6 of such adjacent mat is positioned in close proximity to the plant which is extended through the end part 5 which is overlapped by the end part 6.

The mat is formed from a sheet of fibrous material, preferably dull black and completely saturated with a waterproofing material, preferably black and provided with bendable freed parts in proximity to one end thereof for the passage of the plant. The freed parts are extended upwardly and are to snugly engage the plant. The ultimate product is to possess a characteristic for non-reflecting of the sun rays therefrom, or so it will reduce to a minimum the reflection of the sun rays striking it to prevent the plant being sunburned. The waterproof sheet is slitted at one end portion thereof and with the inner end of the split positioned adjacent the center of the sheet. That portion of the sheet which is not slitted is to be of a width to cover the distance between two plants of a row. See Figure 1. The length of the slit or incision will be such as to provide for the non-slitted part of the mat to be of an area to cover the soil between two plants, even though there be irregularities in planting distance between the plants.

The application of the mats to a row of plants will be such that a plant will be extended through each mat between the transverse median and inner end thereof and with the plant snugly engaged by freed portions of the mat. The mats are arranged in overlapped relation, that is to say the outer end portion of one mat will overlap the inner end portion of an adjacent mat. Further that part of the mat extending from the plant to its outer end will be of an area to cover the soil between a pair of plants of the row. Furthermore the mats when positioned relative to the plants of the row will reduce evaporation and will be of an area to retain the moisture as close to the surface as possible throughout the root zones of the plants, as well as act to keep the soil upon which the mats are positioned moist and loose.

With reference to the mat shown in Figure 4 and indicated generally at 9, it is similar in construction to the form illustrated in Figure 3, with this exception, that it is provided with a pair of slits 10, each arranged at a point between the longitudinal median and each side edge of the mat body and the latter is formed with freed portions 11 adjacent the inner end of each slit. The mat body is of a size to encompass the plants of two rows of plants.

Referring to the mat illustrated in Figure 5 and indicated generally at 12, it is similar in construction to the form shown in Figure 3, with this exception, that the slit 13 and freed portions 14 thereof are located at a point between the longitudinal median and one side edge of the mat body, and the latter is of a size to extend from a plant of one row of plants to a point in proximity to a plant of an adjacent row of plants.

With respect to double row planting, in the case of strawberries, lettuce, etc., and with a row of plants arranged on each side of a ridge the mat 9 will be of a size and so formed as to encompass inwardly of its edges a plant of each row simultaneously, as well as to completely cover the soil between such pair of plants. The mats as applied to the rows will be arranged in overlapped relation to completely cover the soil between the plants of each row. With respect to the employment of mats 12 of the form shown in Figure 5 independent overlapping mats 12 will be applied to the plants of each of the rows and the arrangement will be such, that the mats 12 as applied to one row will overlap those applied to the other row whereby the mats will extend over the top of the ridge between said rows. There will be arranged adjacent each of the ridges a furrow for the application of moisture thereto, that is to say, a furrow will be arranged between each pair of ridges.

What I claim is:—

1. A mulch mat for placing around growing plants arranged in rows comprising a thin flexible sheet of fibrous material having one dimension less than the distance between the rows of plants, the other dimension greater than the distance between adjacent plants in a row and less than twice such distance, and said sheet having a single slit, the sides of which are normally closely adjacent each other, said slit extending from one edge of the sheet in the direction of said second mentioned dimension to a point spaced from the opposite edge approximately the distance between plants in a row, said slit being spaced from each of the other two edges by a distance greater than the length of the slit, whereby when a plurality of such sheets are laid in adjacent rows with their respective slits each engaging a single plant and extending in the direction of the rows, there will be an open space left between the rows of mulching for introduction of moisture into the soil, the ground around each plant will be covered by the sheet surrounding that plant and the slit in each sheet will be overlapped by the unslitted end of the next sheet in the row for the greater portion of the length of the slit to cover the ground between the plants in a row and assist in holding the sides of said slit together.

2. In a method of mulching a plurality of adjacent rows of growing plants, completely covering the ground around each plant by passing each plant of each of the rows through a normally closed slit in a separate mulch, disposing said mulch laterally in opposite directions with respect to the plant but in spaced relation to the mulches of the adjacent rows and disposing the said mulch to completely cover the space between such plant and one of the next adjacent plants in the row, and to substantially completely cover the slit of the mulch surrounding the next adjacent plant to assist in holding the sides of said slit together.

In testimony whereof, I affix my signature hereto.

GLEN B. HOAG.